United States Patent
Horibe et al.

(10) Patent No.: US 10,107,966 B1
(45) Date of Patent: Oct. 23, 2018

(54) SINGLE-MODE POLYMER WAVEGUIDE CONNECTOR ASSEMBLY

(71) Applicant: INTERNATIONAL BUSINESS MACHINES CORPORATION, Armonk, NY (US)

(72) Inventors: Akihiro Horibe, Yokohama (JP); Hidetoshi Numata, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/696,932

(22) Filed: Sep. 6, 2017

(51) Int. Cl.
*G02B 6/30* (2006.01)
*G02B 6/122* (2006.01)
*C09J 7/02* (2006.01)
*G02B 6/12* (2006.01)

(52) U.S. Cl.
CPC ........ *G02B 6/30* (2013.01); *C09J 7/02* (2013.01); *G02B 6/122* (2013.01); *C09J 2203/30* (2013.01); *G02B 2006/12035* (2013.01)

(58) Field of Classification Search
CPC .............. C09J 2203/30; C09J 7/02; G02B 2006/12035; G02B 6/12; G02B 6/122; G02B 6/30
See application file for complete search history.

(56) References Cited

U.S. PATENT DOCUMENTS

| | | | |
|---|---|---|---|
| 6,898,343 B2 * | 5/2005 | Glebov | G02F 1/31 385/21 |
| 6,922,508 B2 * | 7/2005 | Glebov | G02F 1/31 385/43 |
| 8,742,874 B2 | 6/2014 | Sherrer et al. | |
| 9,036,956 B2 | 5/2015 | Tseng et al. | |
| 9,289,921 B2 | 3/2016 | Numata et al. | |
| 9,354,401 B2 | 5/2016 | Leigh et al. | |
| 9,372,305 B2 | 6/2016 | Numata et al. | |
| 9,417,404 B1 | 8/2016 | Barwicz et al. | |
| 2003/0035614 A1 * | 2/2003 | Glebov | G02F 1/31 385/21 |
| 2003/0035632 A1 * | 2/2003 | Glebov | G02F 1/31 385/43 |
| 2004/0101268 A1 * | 5/2004 | Shih | G02B 3/0012 385/141 |

(Continued)

OTHER PUBLICATIONS

Pitwon et al., "Pluggable Electro-Optical Circuit Board Interconnect Based on Embedded Graded-Index Planar Glass Waveguides," Journal of Lightwave Technology. vol. 33. No. 4. Feb. 15, 2015. pp. 741-754.

*Primary Examiner* — Andrew Jordan
(74) *Attorney, Agent, or Firm* — Tutunjian & Bitetto, P.C.; Vazken Alexanian (57) ABSTRACT

A method of fabricating a polymer waveguide (PWG) is presented. The method includes preparing a polymer waveguide (PWG) sheet having a surface with partially exposed cores and partially exposed cladding, the cladding covering the cores and preparing a first dicing tape, the first dicing tape being an ultraviolet (UV) cut type dicing tape defining separation lines on a back side thereof. The method further includes placing the partially exposed cores of the PWG sheet on the first dicing tape to prevent the surface of the PWG sheet from atmospheric contaminations and placing a tape side of the first dicing tape attached to the PWG sheet on a second dicing tape.

2 Claims, 6 Drawing Sheets

(56) References Cited

U.S. PATENT DOCUMENTS

2004/0101782 A1* 5/2004 Gorczyca ............ G02B 3/0056
  430/290
2012/0141071 A1 6/2012 Duis et al.
2016/0363728 A1 12/2016 Wang et al.

* cited by examiner

SINGLE-MODE POLYMER WAVEGUIDE CONNECTOR ASSEMBLY

BACKGROUND

Technical Field

The present invention relates generally to optical waveguides, and more specifically, to a single-mode polymer waveguide connector.

Description of the Related Art

Waveguides are used to transport optical signals over large distances with very low losses. Waveguides employ a difference between a refractive index for an internal medium called "core" and an external medium called "clad." In fiber optics, the transport medium "core" is made of a higher refractive index glass and the external medium "clad" is made of a lower refractive index glass. These two glass layers are surrounded by sheath, shielding, or air. When an optical signal in the inner core layer hits a boundary between core and clad, it is internally reflected instead of escaping from the core layer. Thus, optical fibers can be used to transport very low-loss signals across long distances.

Optical fibers used for waveguides are thin, flexible, and frequently made of silica glass. Appropriate materials are selected in accordance with desired refractive properties. Transmissions over optical fiber suffer from less loss and electromagnetic interference relative to metal wires. In addition, since information propagates through optical fibers at the speed of light, latency is decreased over large distances using optical communications. Some fibers support many transverse transmission modes and are called multi-mode fibers, whereas others support a single mode and are called single-mode fibers. Single-mode fibers are frequently used for long-distance links, as multi-mode fibers are susceptible to modal dispersion over long distances.

SUMMARY

In accordance with an embodiment, a method is provided for fabricating polymer waveguide (PWG) chips for silicon photonic (SiP) packaging. The method includes preparing a polymer waveguide (PWG) sheet having a surface with partially exposed cores and partially exposed cladding, the cladding covering the cores, preparing a first dicing tape, the first dicing tape being an ultraviolet (UV) cut type dicing tape defining separation lines on a back side thereof, placing the partially exposed cores of the PWG sheet on the first dicing tape to prevent the surface of the PWG sheet from atmospheric contaminations, and placing a tape side of the first dicing tape attached to the PWG sheet on a second dicing tape.

In accordance with an embodiment, a combination is provided of a stub fabricated on a polymer and a groove fabricated on a silicon (Si) chip, prepared by a method of fabricating on a polymer a (single-mode) polymer waveguide (PWG) array and a stub so that the (single-mode) polymer waveguide (PWG) array and the stub are aligned with a silicon waveguide (SiWG) array fabricated on a silicon (Si) chip and a groove fabricated along a direction in which the SiWG is fabricated, whereby an adiabatic coupling is realized. The method includes preparing a polymer waveguide (PWG) sheet, preparing a first dicing tape defining separation lines on a back side thereof, placing partially exposed cores of the PWG sheet on the first dicing tape to prevent the PWG sheet from atmospheric contaminations, placing a tape side of the first dicing tape attached to the PWG sheet on a second dicing tape, exposing the first dicing tape to a UV light, and separating each PWG chip of the PWG array.

In accordance with an embodiment, a polymer waveguide (PWG) for silicon photonic (SiP) packaging is presented. The polymer waveguide includes a polymer waveguide (PWG) sheet having a surface with partially exposed cores and partially exposed cladding, the cladding covering the cores and a first dicing tape for receiving the partially exposed cores of the PWG sheet to prevent the surface of the PWG sheet from atmospheric contaminations, the first dicing tape being an ultraviolet (UV) cut type dicing tape defining separation lines on a back side thereof. A tape side of the first dicing tape attached to the PWG sheet is placed on a second dicing tape.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for cleaning a surface of a polymer waveguide (PWG) core array at a silicon side of a PWG chip in order to realize highly efficient adiabatic coupling. Both multimode and single-mode polymer waveguides (PWG) are widely used either in a rigid form on a printed board, or in a flexible form on a polymer base film. The principle of an optical waveguide (WG) is that a combination of core and clad (or cladding), which is a combination of two different type polymers having a different refractive index, is provided and the core is used as a light transmitting path. On the other hand, silicon waveguides (SiWG) in which a light transmitting path is fabricated on a silicon (Si) chip are also widely used. Both in the PWG and in the SiWG, multi-channel waveguides are fabricated in an array in one direction in parallel with each other so that multi-channel light transmitting paths are provided.

Embodiments in accordance with the present invention provide methods and devices for cleaning a surface of a polymer waveguide (PWG) core array by employing an assembly of a polymer waveguide chip and a mechanical transfer (MT) ferrule (PWG-MT) for silicon photonics (SiP) packaging, which connects a silicon optical circuit and an external single mode fiber (SMF) array. The assembly realizes not only low loss coupling between the silicon optical circuit and the SMF, but also realizes a pitch conversion from a silicon waveguide array (50 um) to a SMF ribbon (250 um). The adiabatic coupling method is a valuable technique for SiP packaging technologies. The adiabatic coupling method realizes a lower loss connection between the PWG and the silicon optical circuit than other connection methods, such as a diffraction grating coupling. Moreover, according to the exemplary embodiments of the present invention, at the silicon side of the PWG chip, there is no over clad or cladding. Instead, the PWG core and the silicon waveguide core directly contact each other to enable highly efficient adiabatic coupling.

Embodiments in accordance with the present invention provide methods and devices for transmitting light between the PWG and the SiWG, as well as a coupling which allows light to be transmitted efficiently at a microscopic level with high-precision positioning. In the case of multimode waveguides (WG), when waveguides are coupled to each other or when the waveguide is coupled to a multimode optical fiber, a large cross section of core and almost the same size of core cross section and almost the same numerical apertures can provide such coupling with an acceptable level of loss as long as a precise positioning of abutting cross sections is guaranteed between cross sections coming into connection with each other. This is referred to as "butt coupling." In such case, adiabatic coupling can be used as an alternative method by which evanescent light in an optical axis direction along the array is captured and transmitted over a predetermined distance in an optical axis direction.

Embodiments in accordance with the present invention provide methods and devices for using polymer materials that exhibit favorable properties for use in optical waveguides. Polymers provide good optical properties and are cost effective and easy to fabricate. Polymers are furthermore compatible with printed circuit board manufacturing processes due to a resilience against solder reflow and lamination processes, such that polymer structures can be formed directly on printed circuit boards alongside semiconductor-based components. Polymer waveguides are used for high-density optical interconnects in fiber-optic communications, and other light-based technologies. Waveguide connectors are used to connect between separate polymer waveguides and between polymer waveguides and glass fibers.

The functioning of a waveguide relies on total internal reflection of light, or other electromagnetic radiation, at a boundary. Waveguides at optical frequencies often take advantage of a difference in refractive index between two materials at the boundary. Fiber can be multi-mode or single-mode, referring to the propagation modes of the light as it passes through the waveguide. In the case of multi-mode fibers, multiple different transverse modes (e.g., multiple different light paths through the waveguide) can exist simultaneously in the relatively large waveguide core, where the core has a diameter that is much larger than the wavelength of the light carried. By contrast, in a single-mode fiber, only one transverse mode, called a zeroth mode or a fundamental mode, exists. This advantageously inhibits modal dispersion and provides superior fidelity of signals over long distances. In a single-mode fiber, a wavelength division multiplex (WDM) technology is often used for a broadband communication. When WDM is applied, multiple different frequencies of light are transmitted along one single-mode fiber, each propagating along the fiber in the fundamental mode. When dealing with single-mode optical fiber, an intuitive geometric interpretation for the propagation of light within the fiber is unavailable, with the behavior of the propagation being modeled instead using the Helmholtz equation.

It is to be understood that the present invention will be described in terms of a given illustrative architecture; however, other architectures, structures, substrate materials and process features and steps/blocks may be varied within the scope of the present invention. It should be noted that certain features may not be shown in all figures for the sake of clarity. This is not intended to be interpreted as a limitation of any particular embodiment, or illustration, or scope of the claims.

Figure 1:
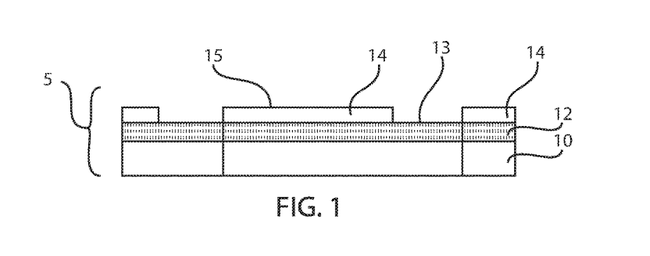
FIG. 1 is a cross-sectional view of a polymer waveguide (PWG) array chip sheet, in accordance with an embodiment of the present disclosure.

Referring now to the drawings in which like numerals represent the same or similar elements and initially to FIG. 1, a cross-sectional view of a polymer waveguide (PWG) array chip sheet, in accordance with an embodiment of the present disclosure is presented.

A PWG array chip sheet 5 includes an under-clad layer 10, a core layer 12, and an over-clad layer 14. A top surface 13 of core layer 12 can be exposed in certain portions. Additionally, the over-clad layer 14 has a top surface 15.

The polymer waveguide is formed by forming waveguide cores on a lower refractive index under cladding polymer layer 10. The cores 12 are formed by depositing, e.g., a higher refractive index polymer material using a photo lithography method or any other appropriate deposition method and patterning the core material 12 to form waveguides of a desired shape. A lower index upper cladding polymer material 14 is then deposited over the cores 12. The optical signal is confined by internal reflection to the waveguide core material 12 at an interface between the waveguide core 12 and the upper and lower cladding materials 10, 14. Single-mode glass fibers often have core diameters from about 5 to about 11 µm. The corresponding single-mode polymer waveguides also have a few cross sectional area of a few micrometers.

Figure 2:
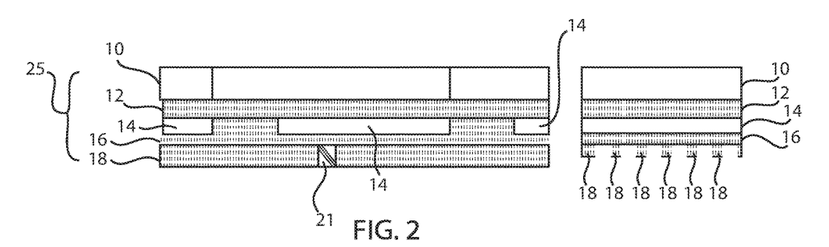
FIG. 2 is a cross-sectional view of the structure of FIG. 1 where a first dicing tape is attached to the PWG sheet, in accordance with an embodiment of the present disclosure.

FIG. 2 is a cross-sectional view of the structure of FIG. 1 where a first dicing tape is attached to the PWG sheet, in accordance with an embodiment of the present disclosure.

The PWG sheet 5 is placed over an adhesive layer 16 of a first dicing tape 18 to form a structure 25. The first dicing tape 18 can be, e.g., an ultraviolet (UV) cut type dicing tape.

Separation lines or perforation lines or half-cut lines are made at a back side of the first dicing tape 18. The separation lines can be made by a perforation cutter or a dicing saw (not shown). In one example, the perforation cutter can make perforation lines, whereas the dicing saw can make half-cut lines.

Figure 3:
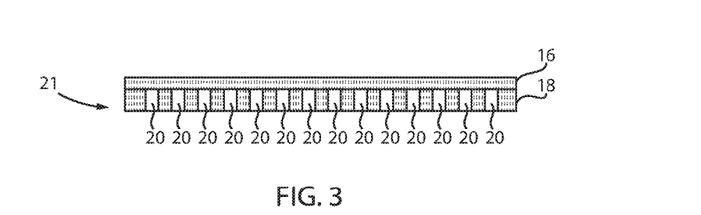
FIG. 3 is an enlarged view of a section of the perforated adhesive layer attached to the first dicing tape of FIG. 2, in accordance with an embodiment of the present disclosure.

FIG. 3 is an enlarged view of a section 21 of the perforated adhesive layer attached to the first dicing tape of FIG. 2, in accordance with an embodiment of the present disclosure.

The section 21 of the perforated adhesive layer depicts the first dicing tape 18 having recesses or gaps 20 formed due to the application of either a perforation cutter or a dicing saw.

Figure 4:
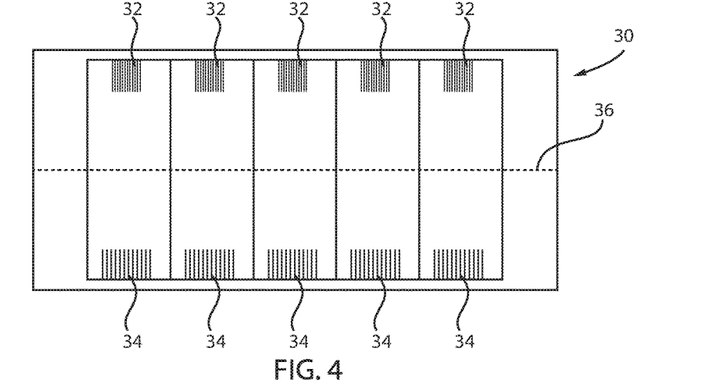
FIG. 4 is a top view of the PWG sheet on top of the first dicing tape with separation lines, in accordance with an embodiment of the present disclosure.

FIG. 4 is a top view 30 of the PWG sheet on top of the first dicing tape with separation lines, in accordance with an embodiment of the present disclosure.

One end depicts the SiP chip connector side 32 and the other end depicts the MT connector side 34. A separation line 36 extends across the PWG sheet.

Figure 5:
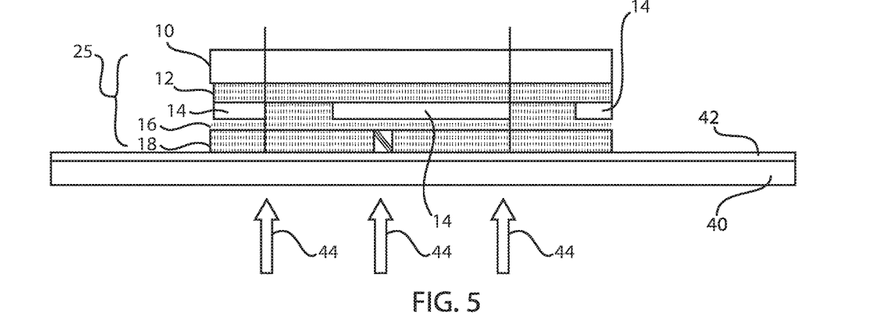
FIG. 5 is a cross-sectional view of the semiconductor device of FIG. 3 where the PWG sheet and the first dicing tape are placed over a second dicing tape, in accordance with an embodiment of the present disclosure.

FIG. 5 is a cross-sectional view of the semiconductor device of FIG. 3 where the PWG sheet and the first dicing tape are placed over a second dicing tape, in accordance with an embodiment of the present disclosure.

The structure 25 of FIG. 2 is placed over an adhesive layer 42 of a second dicing tape 40. Additionally, a UV light 44 of about 365 nm is applied to the second dicing tape 40, as well as the structure 25.

Figure 6:
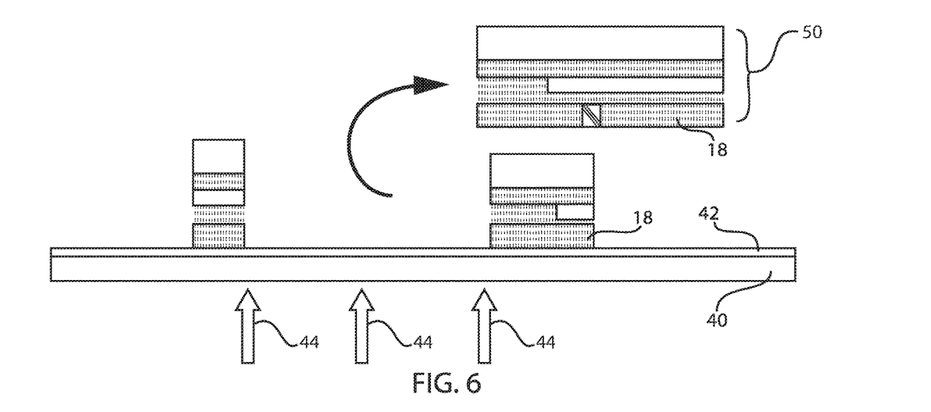
FIG. 6 is a cross-sectional view of the semiconductor device of FIG. 5 where a PWG array chip is removed therefrom, in accordance with an embodiment of the present disclosure.

FIG. 6 is a cross-sectional view of the semiconductor device of FIG. 5 where a PWG array chip is removed therefrom, in accordance with an embodiment of the present disclosure.

A PWG array chip 50 is removed from the structure 25 by, e.g., using a dicing saw. Thus, the first dicing tape 18 is separated from the second dicing tape 40. The first dicing tape 18 includes a 365 nm UV light absorbent material in the adhesive and base film sections. Moreover, cutting of the first dicing tape 18 attached to the PWG sheet results in a plurality of the first dicing tapes being formed. This aids in the separation of the PWG chips by using the 365 nm UV light and the dicing saw.

Figure 7:
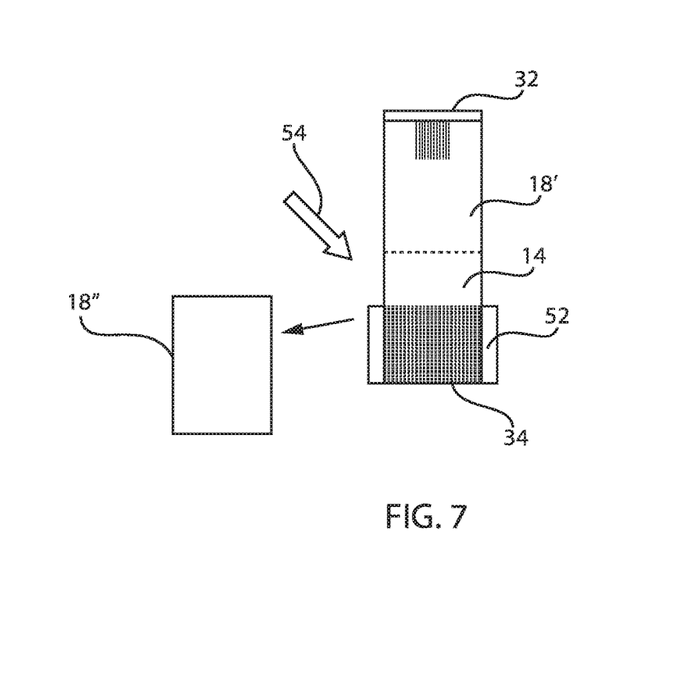
FIG. 7 is a top view of a polymer waveguide-mechanical transfer (PWG-MT) assembly illustrating removal of a section of the first dicing tape, in accordance with an embodiment of the present disclosure.

FIG. 7 is a top view of a polymer waveguide-mechanical transfer (PWG-MT) assembly illustrating removal of a section of the first dicing tape, in accordance with an embodiment of the present disclosure.

The PWG array chip sheet 5 is placed over or attached to a ferrule 52. A section 18" of the dicing tape 18 is removed and 405 nm light 54 is transparent from the first dicing tape 18. The remaining dicing tape is designated as 18'.

Figure 8:
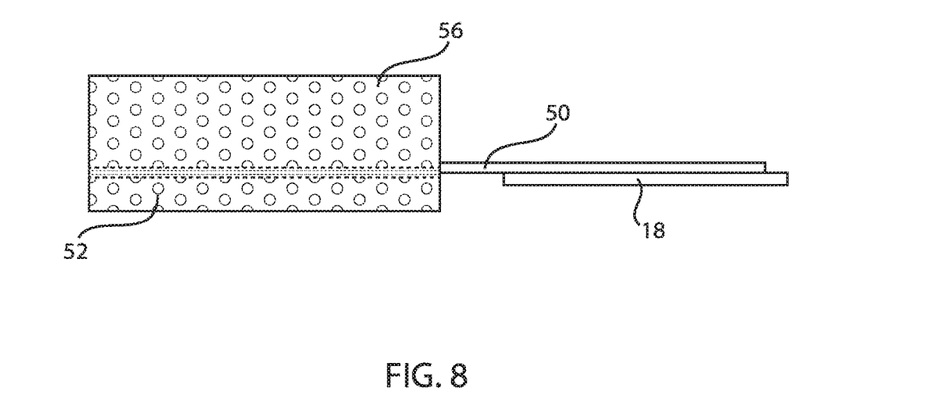
FIG. 8 is a cross-sectional view of FIG. 7 where the PWG chip and a glass lid are inserted into an MT ferrule for receiving the PWG, in accordance with an embodiment of the present disclosure.

FIG. 8 is a cross-sectional view of FIG. 7 where the PWG chip and a glass lid are inserted into an MT ferrule for receiving the PWG, in accordance with an embodiment of the present disclosure.

The PWG chip 50 and a glass lid 56 are inserted into the MT ferrule 52. The MT ferrule 52 can be, e.g., U-shaped. The PWG chip 50 is aligned with the MT ferrule 52. The PWG chip 50 and the glass lid 56 are fixed to the MT ferrule 52 by, e.g., using a UV glue.

Figure 9:
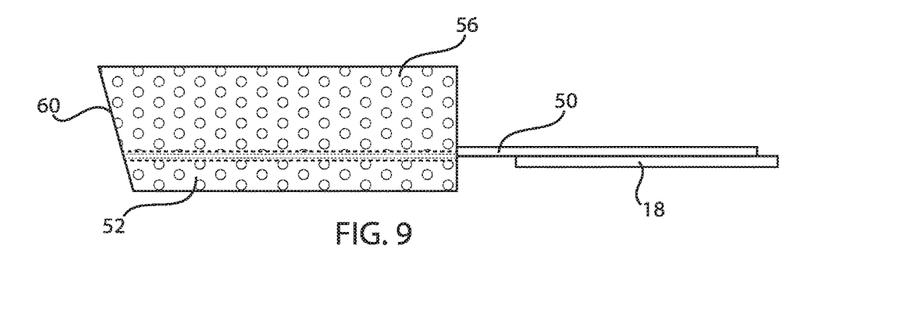
FIG. 9 is a cross-sectional view of FIG. 8 where the MT connector surface is polished and the PWG-MT assembly is washed, in accordance with an embodiment of the present disclosure.

FIG. 9 is a cross-sectional view of FIG. 8 where the MT connector surface is polished and the PWG-MT assembly is washed, in accordance with an embodiment of the present disclosure.

The MT connector surface is polished to form an angled surface 60 at an angle of, e.g., about 8 degrees.

Figure 10:
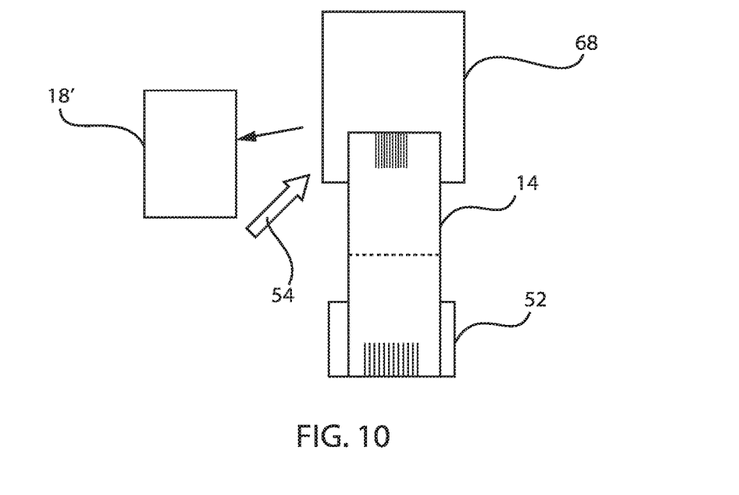
FIG. 10 is a top view of a polymer waveguide-mechanical transfer (PWG-MT) assembly illustrating removal of the remaining sections of the first dicing tape and connection of the silicon photonic (SiP) circuit to the PWG, in accordance with an embodiment of the present disclosure.

FIG. 10 is a top view of a polymer waveguide-mechanical transfer (PWG-MT) assembly illustrating removal of the remaining sections of the first dicing tape and connection of the silicon photonic (SiP) circuit to the PWG, in accordance with an embodiment of the present disclosure.

The remaining section 18' is removed and the PWG array chip sheet 5 is attached to the SiP circuit 68. Thus, precise assembly of a PWG-MT can be realized without a contamination on a PWG chip after a polishing and washing process of a PWG-MT assembly.

As a result, prevention of any sub-micron particle contamination on the surface of the PWG core array at the silicon side of the PWG chip is achieved by the in-situ PWG chip fabrication and covering of the surface of the PWG core array at the silicon side of the PWG chip in the clean and sequential PWG chip fabrication process.

Figure 11:
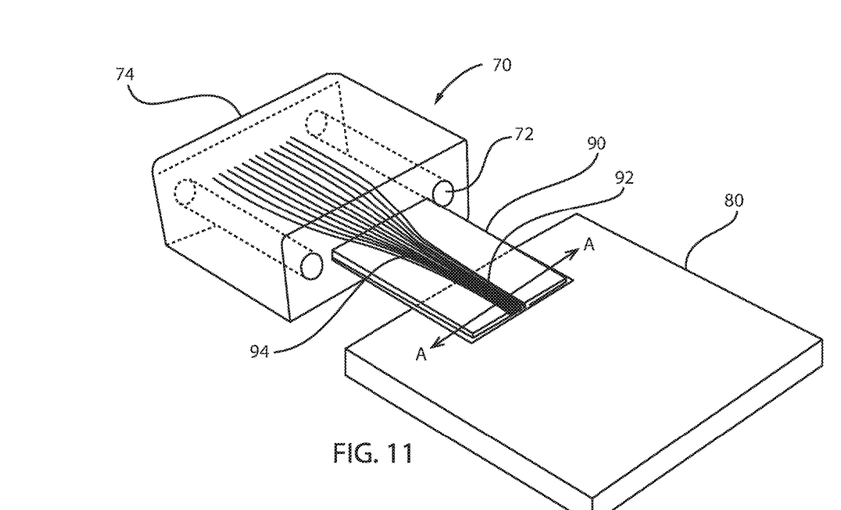
FIG. 11 is a perspective view of a compliant polymer interface between standard optical fibers and nano-photonic waveguides, in accordance with an embodiment of the present disclosure.

FIG. 11 is a perspective view of a compliant polymer interface between standard optical fibers and nano-photonic waveguides, in accordance with an embodiment of the present disclosure.

The structure includes a standard removable fiber connector interface 70, integrated flexible polymer waveguides 90, and a mechanically compliant extension interfacing with a nano-photonic die 80. A 12×1 MT fiber mechanical interface 70 is shown here but other fiber connector standards could be used as well. In the MT standard, large holes 72 in the compliant interface receive matching metal pins (not shown) from a fiber connector to provide self-alignment between fibers and mode-matched polymer waveguides.

Standard single-mode optical fibers are butt-coupled 74 to mode-matched polymer waveguides. The cross-section of the polymer waveguide is then adiabatically transformed from a fiber coupler to a higher confinement waveguide for routing (routing waveguide 94). The routing in the compliant interface can be arbitrary. A simple pitch conversion is shown but more involved schemes are possible as well such as port shuffles and L-shaped connections with a 90 degree bend from fiber to the die. The polymer waveguides are then adiabatically coupled (adiabatic coupler 92) to nano-photonic waveguides on the photonic die 80.

Optical connectors terminate an end of the optical fiber and provide for rapid connection and disconnection. By aligning the fibers of two sections of optical cable, the connectors ensure an easy connection and allow light to pass with little loss. Ideally, the connectors have some form of locking ability that maintains a strong connection and prevents fibers in respective connectors from moving relative to one another. Maintaining good alignment is important for minimizing return loss, which occurs at discontinuities in the connection. Even small deviations in positioning and alignment can create significant return losses.

The MT connector 70 can be a multi-fiber connector that is often used for ribbon cables. It is used in, for example, preterminated cable assemblies and cabling systems. In particular, the MT connector allows multiple single-mode fibers to connected in parallel, such that one fiber ribbon cable includes multiple glass fibers and thereby provide increased transmission bandwidth. Connection strength is provided by latches on the connector that lock into place on a mated plug using a spring mechanism. Guide pins are used to aid in alignment of the ferrules and removable housings can be employed for modularity.

Figure 12:
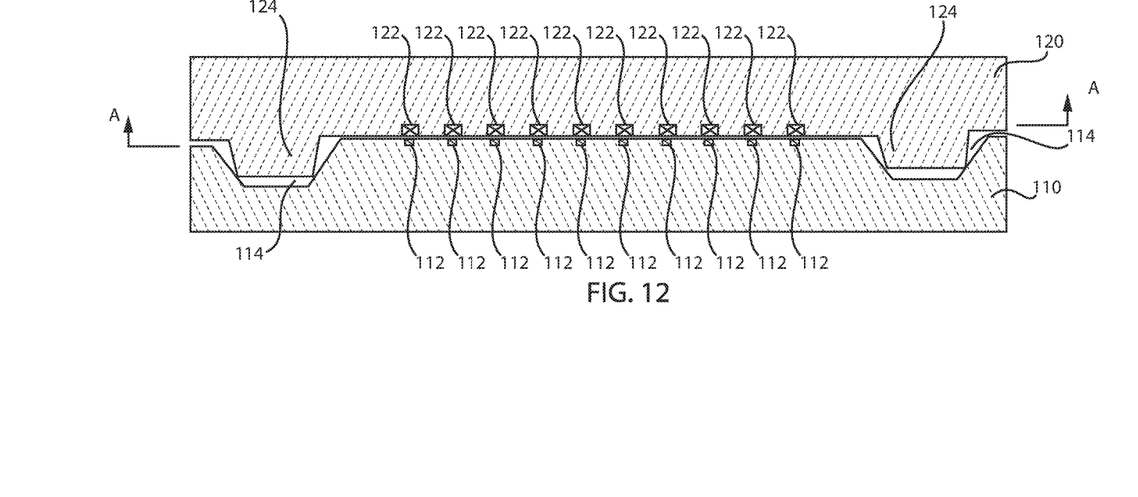
FIG. 12 is a cross-sectional view of the polymer interface between standard optical fibers and nano-photonic waveguides of FIG. 11 taken along line A-A, in accordance with an embodiment of the present disclosure.

FIG. 12 is a cross-sectional view of the polymer interface between standard optical fibers and nano-photonic waveguides of FIG. 11 taken along line A-A, in accordance with an embodiment of the present disclosure.

A silicon (Si) chip 110 can be connected to a polymer ribbon 120. The Si chip 110 includes a plurality of Si waveguides 112. The polymer ribbon 120 includes a plurality of polymer waveguides 122. The Si waveguides 112 are configured to be aligned with the polymer waveguides 122. The Si chip 110 includes recesses 114 for receiving ridges 124 formed on the polymer ribbon 120.

The compliant interface can be assembled to nano-photonic dies using standard high-volume, low-cost microelectronic packaging equipment. To bridge the gap between the typical +/−10 um accuracy of high-throughput pick and place tools and the desired +/−2 um accuracy for optimal optical performance, matching sets of lithographically defined self-alignment structures are used as shown in FIG. 12. Alignment ridges 124 are defined on the compliant interface with matching slanted grooves 114 on the nano-photonic die 110.

Figure 13:
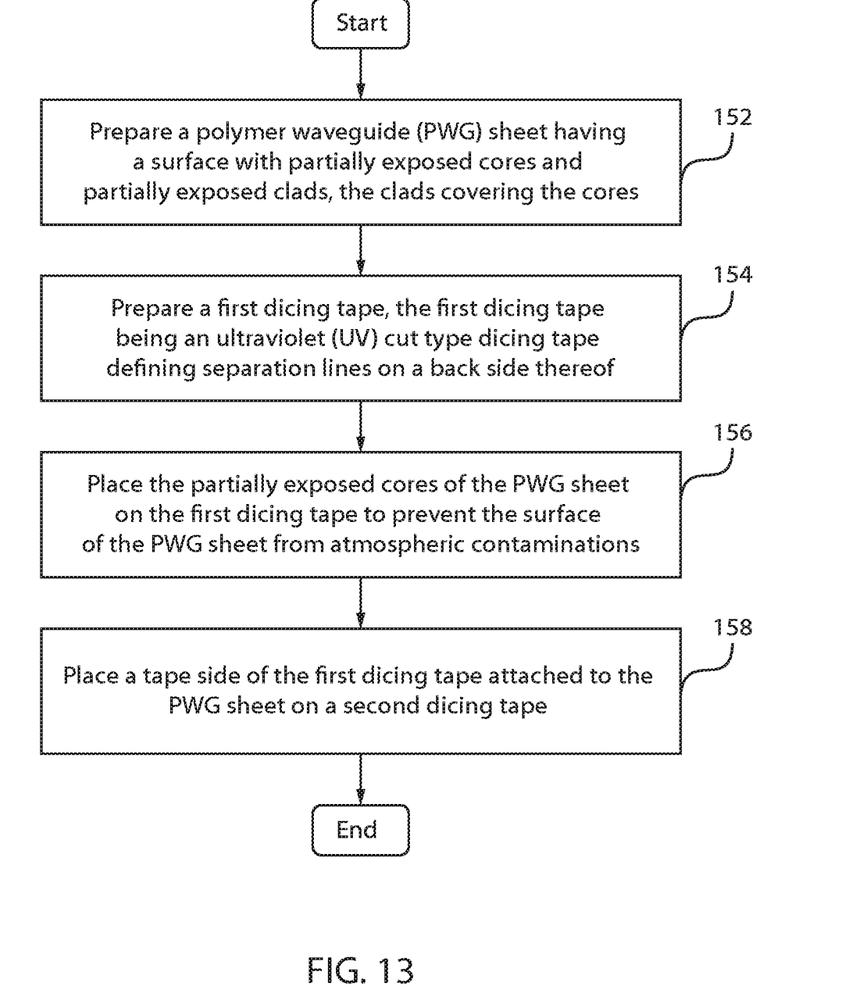
FIG. 13 is a block/flow diagram of a method for fabricating polymer waveguide (PWG) chips for silicon photonic (SiP) packaging, in accordance with an embodiment of the present disclosure.

FIG. 13 is a block/flow diagram of a method for fabricating polymer waveguide (PWG) chips for silicon photonic (SiP) packaging, in accordance with an embodiment of the present disclosure.

At block 152, a polymer waveguide (PWG) sheet having a surface with partially exposed cores and partially exposed cladding is prepared, the cladding covering the cores.

At block 154, a first dicing tape is prepared, the first dicing tape being an ultraviolet (UV) cut type dicing tape defining separation lines on a back side thereof.

At block 156, the partially exposed cores of the PWG sheet are placed on the first dicing tape to prevent the surface of the PWG sheet from atmospheric contaminations.

At block 158, a tape side of the first dicing tape attached to the PWG sheet is placed on a second dicing tape.

In summary, the exemplary methods of the present invention employ in-situ PWG chip fabrication and covering of the surface of the PWG core array at the silicon side of the PWG chip in the clean and sequential PWG chip fabrication process for preventing any sub-micron particle contamination. The protection cover structure attached to the PWG array chip at the in-situ PWG chip fabrication process can prevent the silicon side surface of the PWG core array from contamination of sub-micron particles such as polishing dusts and washing liquids while performing polishing and washing processes. The protection cover is made of one or more separation lines (perforation or half-cut lines) made to attach to the UV cut type dicing tape. Each PWG chip and UV cut type dicing tape is put on a normal dicing tape, separated by a dicing saw, and exposed to a 365 nm light. A half of a UV cut type dicing tape is removed from the PWG chip at a PWG-MT assembly process and the other half of the dicing tape is removed at the SiP circuit. The first dicing tape can be thicker than the second dicing tape. Additionally, the first dicing tape can have a stronger adhesive layer than that of the second dicing tape.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical mechanisms (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present embodiments. The compounds with additional elements will be referred to herein as alloys.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Having described preferred embodiments of a method of fabricating polymer waveguide (PWG) chips for silicon photonic (SiP) packaging (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A polymer waveguide (PWG) comprising:
    a polymer waveguide (PWG) sheet having a surface with partially exposed cores and partially exposed cladding, the cladding covering the cores; and
    a first dicing tape for receiving the partially exposed cores of the PWG sheet to prevent the surface of the PWG sheet from atmospheric contaminations, the first dicing tape being an ultraviolet (UV) cut type dicing tape defining separation lines on a back side thereof;
    wherein a tape side of the first dicing tape attached to the PWG sheet is placed on a second dicing tape.

2. The polymer waveguide of claim 1, wherein the first dicing tape includes a 365 nm UV light absorbent material in adhesive and base film sections.

* * * * *